(12) United States Patent
Cheng

(10) Patent No.: US 9,088,965 B2
(45) Date of Patent: *Jul. 21, 2015

(54) DATA TRANSMISSION METHODS AND APPARATUSES USING THE SAME

(71) Applicant: Acer Incorporated, Taipei Hsien (TW)

(72) Inventor: Tsung-Yo Cheng, Taipei Hsien (TW)

(73) Assignee: ACER INCORPORATED, Taipei Hsien (TW)

( * ) Notice: Subject to any disclaimer, the term of this patent is extended or adjusted under 35 U.S.C. 154(b) by 185 days.

This patent is subject to a terminal disclaimer.

(21) Appl. No.: 13/666,550

(22) Filed: Nov. 1, 2012

(65) Prior Publication Data

US 2013/0058242 A1     Mar. 7, 2013

Related U.S. Application Data

(63) Continuation-in-part of application No. 13/290,132, filed on Nov. 7, 2011.

(60) Provisional application No. 61/619,839, filed on Apr. 3, 2012, provisional application No. 61/642,660, filed on May 4, 2012.

(30) Foreign Application Priority Data

Aug. 3, 2011   (TW) ............................. 100127532 A

(51) Int. Cl.
*H04W 76/02*     (2009.01)
*H04W 24/10*     (2009.01)
(Continued)

(52) U.S. Cl.
CPC .............. *H04W 76/02* (2013.01); *H04W 24/10* (2013.01); *H04W 28/04* (2013.01); *H04W 28/18* (2013.01); *H04W 72/04* (2013.01); *H04W 80/06* (2013.01)

(58) Field of Classification Search
CPC combination set(s) only.
See application file for complete search history.

(56) References Cited

U.S. PATENT DOCUMENTS

| | | | |
|---|---|---|---|
| 2001/0023453 A1* | 9/2001 | Sundqvist | ..................... 709/232 |
| 2002/0122385 A1 | 9/2002 | Banerjee | |

(Continued)

FOREIGN PATENT DOCUMENTS

| | | |
|---|---|---|
| CN | 101882983 | 11/2010 |
| KR | 2007-0099095 | 10/2007 |

OTHER PUBLICATIONS

European Search Report dated Feb. 14, 2013.
(Continued)

*Primary Examiner* — Alpus H Hsu
*Assistant Examiner* — Yee Lam
(74) *Attorney, Agent, or Firm* — McClure, Qualey & Rodack, LLP

(57) ABSTRACT

A mobile communication device with a wireless module and a controller module is provided for improving data throughput by dynamically adjusting a window size of a communication protocol layer. The wireless module performs wireless transceiving to and from a service network. The controller module measures a link quality of the service network associated with a first protocol layer via the wireless module, and determines a number of transmission layers supported for spatial multiplexing associated with the first protocol layer. Also, the controller module adjusts a data transmission parameter associated with a second protocol layer according to the link quality and the number of transmission layers associated with the first protocol layer. Particularly, the second protocol layer is hierarchically higher than the first protocol layer in a multi-layer protocol stack.

6 Claims, 6 Drawing Sheets

(51) Int. Cl.
  *H04W 28/18* (2009.01)
  *H04W 80/06* (2009.01)
  *H04W 28/04* (2009.01)
  *H04W 72/04* (2009.01)

(56) References Cited

U.S. PATENT DOCUMENTS

| | | |
|---|---|---|
| 2008/0085717 A1 | 4/2008 | Chhabra et al. |
| 2009/0055550 A1* | 2/2009 | Way et al. .................. 709/233 |
| 2010/0205310 A1* | 8/2010 | Altshuler et al. ............ 709/228 |
| 2011/0106969 A1* | 5/2011 | Choudhury et al. ......... 709/236 |
| 2011/0191414 A1* | 8/2011 | Ma et al. .................... 709/203 |

OTHER PUBLICATIONS

English language translation of abstract of KR 2007-0099095 (published Oct. 9, 2007).

Ren, F., et al.; "Modeling and Improving TCP Performance over Cellular Link with Variable Bandwidth;" IEEE Transactions on Mobile Computing; vol. 10; No. 8; Aug. 2011; pp. 1057-1070.

Taiwanese language office action dated Jun. 6, 2014.

English language translation of abstract of CN 101882983 (published Nov. 10, 2010).

Lee, J. et al.; "MIMO Technologies in 3GPP LTE and LTE-Advanced;" EURASIP Journal on Wireless Communications and Networking; 2009; pp. 1-14.

* cited by examiner

DATA TRANSMISSION METHODS AND APPARATUSES USING THE SAME

CROSS REFERENCE TO RELATED APPLICATIONS

This Application is a Continuation-In-Part (CIP) of U.S. patent application Ser. No. 13/290,132, filed on Nov. 7, 2011, which claims priority of Taiwan Patent Application No. 100127532, filed on Aug. 3, 2011. This Application claims priority of U.S. Provisional Application No. 61/619,839, filed on Apr. 3, 2012, the entirety of which is incorporated by reference herein. Also, this Application claims priority of U.S. Provisional Application No. 61/642,660, filed on May 4, 2012, the entirety of which is incorporated by reference herein.

BACKGROUND OF THE INVENTION

1. Field of the Invention

The invention generally relates to data throughput control, and more particularly, to apparatuses and methods for improving data throughput by dynamically adjusting a window size of a communication protocol layer.

2. Description of the Related Art

With rapid development in technology, a user may easily connect to a network using desktop computers, notebook computers, Personal Digital Assistants (PDAs) or smart phones. In order for electronic equipment having varying specifications to be able to communicate with the same network, an OSI (Open Systems Interconnection) network model has been provided by the ISO (International Organization for Standardization) for managing the network intercommunication between two systems.

In a network environment in compliance with the OSI model, each layer of a receiving device or a transmitting device is configured to recognize data from the same layer. Data packets are sequentially transmitted from the top layer to the bottom layer of a transmitting network device and then transmitted to a receiving network device using application programs. After receiving data packages, the receiving network device sequentially unpacks each data package, which is then distributed to a corresponding layer thereof. Note that each layer may have varying transmission parameters and buffer sizes for their respective processing tasks. However, data stall may occur when data is being transmitted from a faster higher layer to a slower lower layer. Meanwhile, a faster lower layer may not improve overall data throughput, if a higher layer encounters an insufficient data buffer or transmission blockages.

BRIEF SUMMARY OF THE INVENTION

Thus, the invention proposes solutions for resolving the aforementioned problems to improve overall data throughput for a mobile communication device, such as a User Equipment (UE), Mobile Station (MS), Mobile Terminal (MT), or others.

In one aspect of the invention, a mobile communication device comprising a wireless module and a controller module is provided. The wireless module performs wireless transceiving to and from a service network. The controller module measures a link quality of the service network associated with a first protocol layer via the wireless module, and determines a number of transmission layers supported for spatial multiplexing associated with the first protocol layer. Also, the controller module adjusts a data transmission parameter associated with a second protocol layer according to the link quality and the number of transmission layers associated with the first protocol layer. Particularly, the second protocol layer is hierarchically higher than the first protocol layer in a multi-layer protocol stack.

In another aspect of the invention, a data transmission method for a mobile communication device wirelessly connected to a service network according to a multi-layer protocol stack is provided. The method comprises the steps of measuring a link quality of the service network associated with a first protocol layer, determining a number of transmission layers supported for spatial multiplexing associated with the first protocol layer; and adjusting a data transmission parameter associated with a second protocol layer according to the link quality and the number of transmission layers associated with the first protocol layer, wherein the second protocol layer is hierarchically higher than the first protocol layer in the multi-layer protocol stack.

Other aspects and features of the invention will become apparent to those with ordinary skill in the art upon review of the following descriptions of specific embodiments of the mobile communication devices and data transmission methods.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
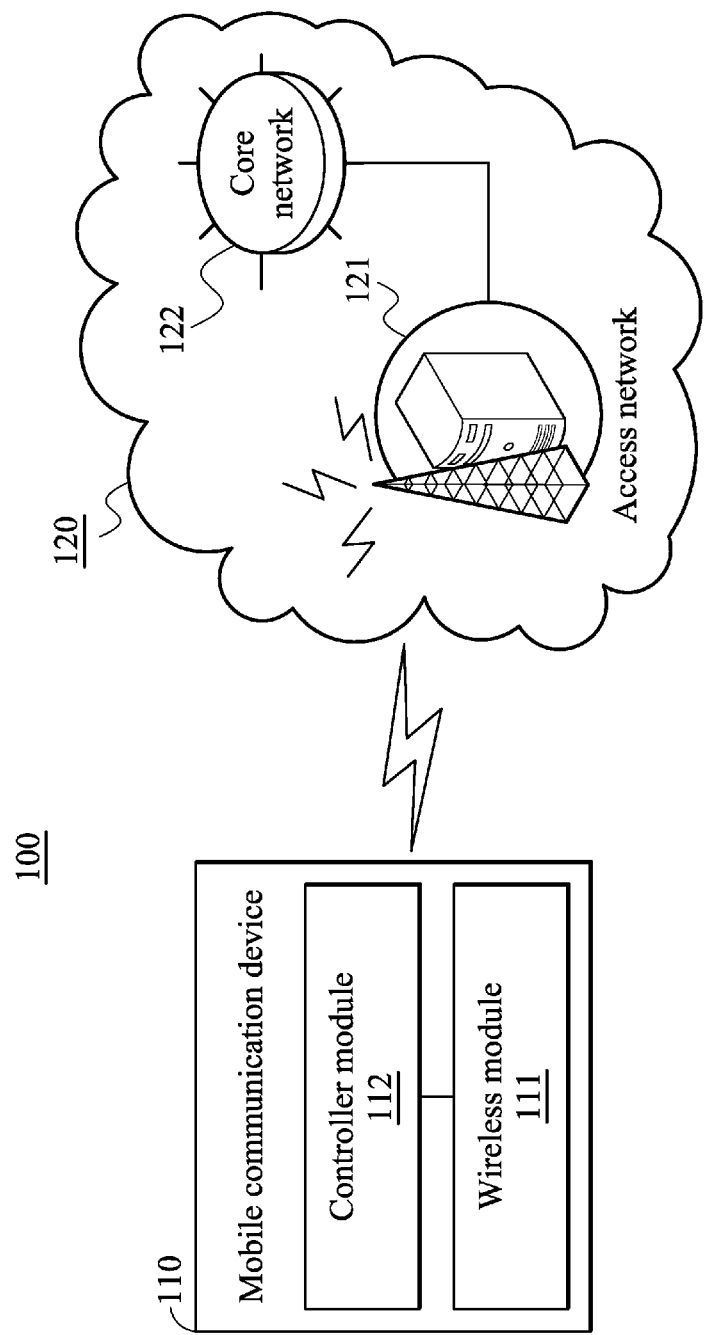
FIG. 1 is a block diagram illustrating a network environment according to an embodiment of the invention.

FIG. 1 is a block diagram illustrating a network environment according to an embodiment of the invention. In the network environment 100, the mobile communication device 110 is wirelessly connected to the service network 120 via the air interface for obtaining wireless services. The service network 120 comprises at least one cellular access network 121 and the core network 122. In general, the cellular access network 121 is controlled by the core network 122 to provide the functionality of wireless transceiving, and the cellular access network 121 may comprise one or more cellular stations, such as base stations, Node-Bs, or evolved Node-B (eNB), depending on the radio access technology in use. Although not shown, the core network 122 may further enable interfacing with external networks, such as the Public Switched Telephone Network (PSTN), which is called the Circuit Switched (CS) domain functionality, and/or interfacing with the Internet Protocol (IP) based Network, such as the Internet, which is called the Packet Switched (PS) domain functionality.

The mobile communication device 110 comprises a wireless module 111 and a controller module 112, wherein the wireless module 111 is configured to perform the functionality of wireless transceiving and the controller module 112 is configured to control the operation of the wireless module 111. To further clarify, the wireless module 111 may be a Radio Frequency (RF) unit (not shown), and the controller module 112 may be a general-purpose processor or Micro-Control Unit (MCU) of a baseband unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 2100 MHz, or 2.6 GHz utilized in Long Term Evolution (LTE) or LTE-Advanced technology, or others depending on the radio access technology in use. Although not shown, the mobile communication device 110 may further comprise other functional components, such as a display unit and/or keypad serving as the Man-Machine Interface (MMI), a storage unit storing the program codes of applications, or others.

Figure 2:
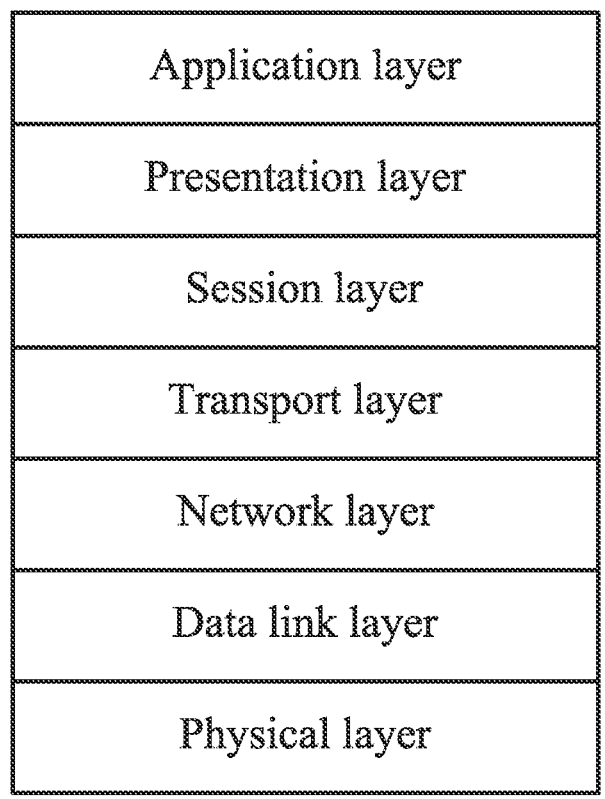
FIG. 2 is a block diagram illustrating a multi-layer protocol stack in compliance with the OSI model according to an embodiment of the invention.

FIG. 2 is a block diagram illustrating a multi-layer protocol stack in compliance with the OSI model according to an embodiment of the invention. From bottom to top, Layer 1~Layer 7 sequentially include a physical layer, data link layer, network layer, transport layer, session layer, presentation layer, and application layer. The physical layer is defined as the bottom layer closest to the hardware devices, while the application layer is defined as the top layer closest to the software programs. In general, Layers 1 through 3 deal with network access and Layers 4 through 7 deal with end-to-end communications between the message source and the message destination. Each layer includes at least one function that is contained between an upper and a lower logical boundary. The services of each layer are combined with the services of the lower layers to create new services that are made available to the higher layers.

Specifically, the physical layer and the data link layer in the OSI model are configured to handle network hardware connection and may be implemented on various network access interfaces, such as Ethernet, Token-Ring or Fiber Distributed Data Interface (FDDI), etc. The network layer in the OSI model is configured to deliver messages between a transmitting device and a receiving device using various protocols, such as identifying addresses or selecting transmission paths using Internet Protocol (IP), Address Resolution Protocol (ARP), Reverse Address Resolution Protocol (RARP), or Internet Control Message Protocol (ICMP). The transport layer in the OSI model is configured to deliver messages between different hosts using Transmission Control Protocol (TCP) and User Datagram Protocol (UDP). The session layer, the presentation layer, and the application layer in the OSI model are configured to provide various application protocols, such as TELNET, FTP, SMTP, POP3, SNMP, NNTP, DNS, NIS, NFS, and HTTP. The present invention may be applied to any wireless network system having a multi-layer structure of protocol layers for data transmission.

Figure 3:
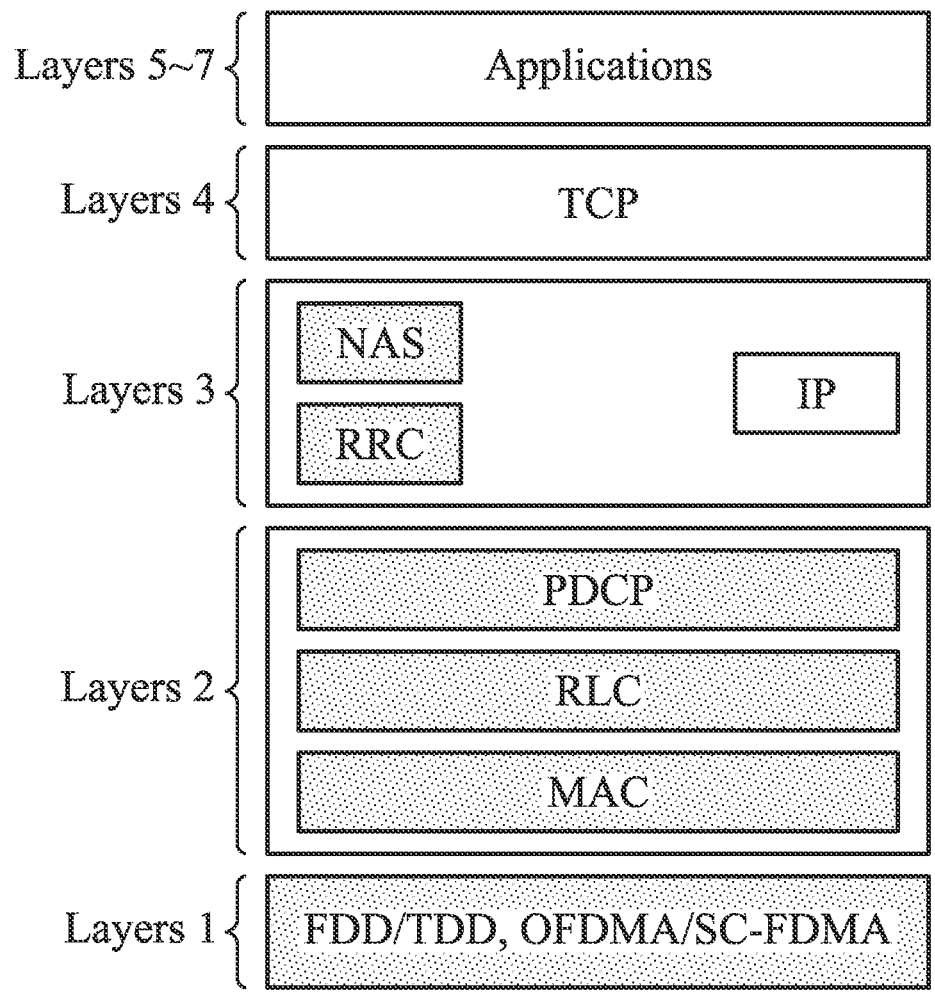
FIG. 3 is an exemplary diagram illustrating the mapping relations between the OSI-model protocol stack and the LTE protocol stack according to an embodiment of the invention.

Note that, in the OSI model, various wireless communication standards, such as WiFi, GSM/GPRS, WCDMA, CDMA2000, LTE, and LTE-Advanced, etc., may be employed to enable signaling and communication between a transmitter and a receiver through the network layer. FIG. 3 is an exemplary diagram illustrating the mapping relations between the OSI-model protocol stack and the LTE protocol stack according to an embodiment of the invention. As shown in FIG. 3, the physical layer in the OSI model is replaced with the LTE Layer 1 which provides radio access using the Frequency-Division Duplexing/Time-Division Duplexing (FDD/TDD) or Orthogonal Frequency Division Multiplexing/Single-Carrier Frequency-Division Multiple Access (OFDMA/SC-FDMA) technology. The data link layer in the OSI model is replaced with the LTE Layer 2 which comprises the sub-layers Medium Access Control (MAC), Radio Link Control (RLC), and Packet Data Convergence Protocol (PDCP). The network layer in the OSI model is partially replaced with the LTE sub-layers Radio Resource Control (RRC) and Non-Access Stratum (NAS). In addition to the LTE sub-layers RRC and NAS, the network layer also comprises an entity which adopts IP for handling addressing, routing, service type specification, packet fragmentation, packet reassembling and security. The transport layer in the OSI model adopts TCP for handling packet sequence numbers, acknowledgement packets, checksums and re-transmissions. The session layer, the presentation layer, and the application layer in the OSI model are configured to provide application protocols.

Figure 4:
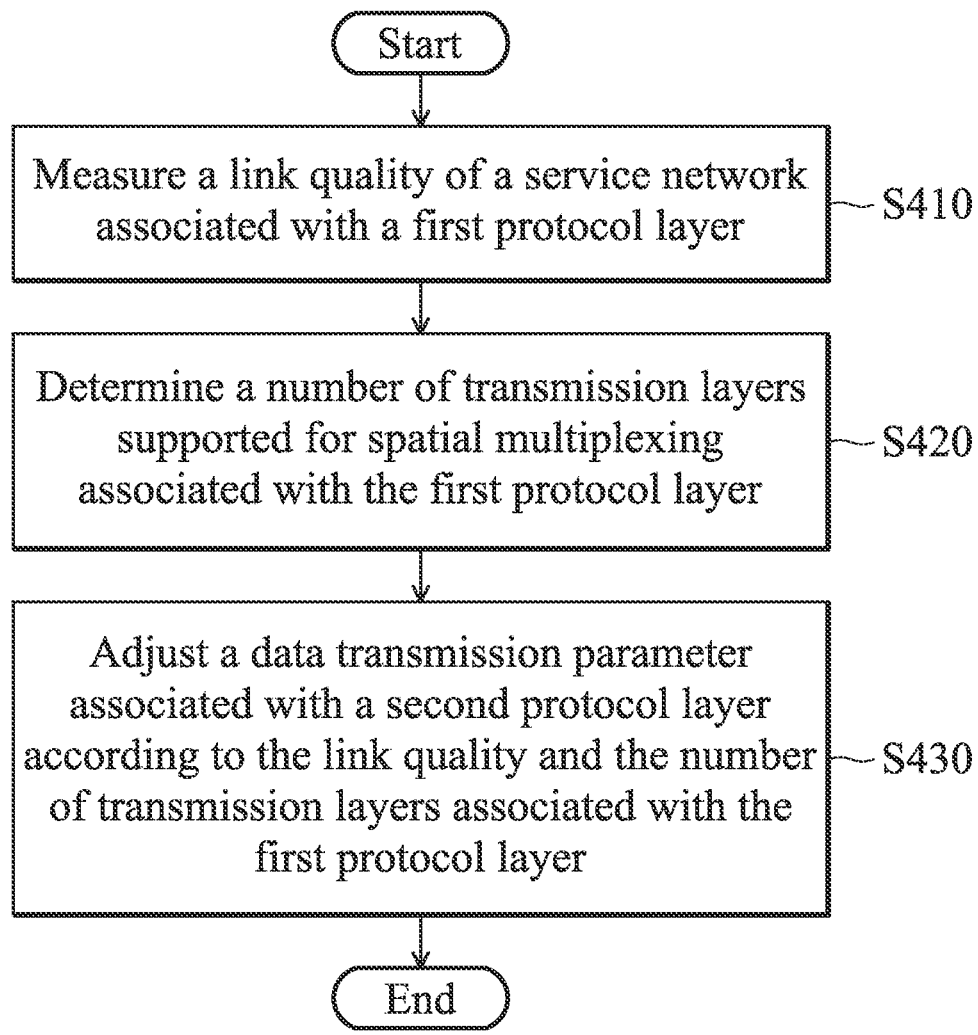
FIG. 4 is a flow chart illustrating the data transmission method according to an embodiment of the invention.

FIG. 4 is a flow chart illustrating the data transmission method according to an embodiment of the invention. The data transmission method may be applied in a mobile communication device, such as the mobile communication device 110, for dynamically adjusting a window size of a communication protocol layer to improve data throughput. To begin, the mobile communication device measures a link quality of a service network associated with a first protocol layer (step 410). Next, the mobile communication device determines a number of transmission layers supported for spatial multiplexing associated with the first protocol layer (step S420). After that, the mobile communication device adjusts a data transmission parameter associated with a second protocol layer according to the link quality and the number of transmission layers associated with the first protocol layer (step S430). Specifically, the second protocol layer is hierarchically higher than the first protocol layer in a multi-layer protocol stack. Note that, the data transmission parameter may be applied for downlink data transmission, or uplink data transmission, or both downlink and uplink data transmissions.

For the embodiment of FIG. 3, the link quality in step S410 may be a Channel Quality Indicator (CQI) of a downward transmission link from the service network, and the number of transmission layers in step S420 may be a Rank Indicator (RI) used in Multiple-Input Multiple-Output (MIMO), while the first protocol layer may be the physical layer in the LTE protocol stack. The data transmission parameter in step S430 may be a TCP/IP window size, while the second protocol layer may be the network layer or the transport layer in the OSI-model protocol stack which has the lower three layers replaced with the LTE protocol stack. For example, in step S420, if a 2×2 MIMO is employed, the RI equals to 2, or else, if MIMO is not employed, the RI equals to 1. Specifically, in step S430, the data transmission parameter may be adjusted by applying the following formula:

$$(MaxTCPWindowSize - MinTCPWindowSize) \times \frac{CQI\_Indexed\_TBS}{MAX\_CQI\_TBS} \div RI \times Weight$$

wherein MaxTCPWindowSize represents the maximum TCP/IP window size, MinTCPWindowSize represents the minimum TCP/IP window size, CQI_Indexed_TBS represents a Transport Block Size (TBS) corresponding to the measured CQI, MAX_CQI_TBS represents another TBS corresponding to the maximum CQI, and Weight represents a constant or a weighting function of the TBS corresponding to the measured CQI.

Specifically, the maximum CQI may be determined according to the Table 7.2.3-1 specified in the 3GPP TS 36.213 specification, and the TBS corresponding to the measured CQI and the TBS corresponding to the maximum CQI may be determined by looking up the Tables 7.1.7.1-1 and 7.1.7.2.1-1 specified in the 3GPP TS 36.213 specification, wherein the Tables 7.1.7.1-1 and 7.1.7.2.1-1 describe the mapping relations between the Modulation and Coding Scheme (MCS) index and TBS index. If Weight is a weighting function of the measured CQI, the weighting function may be a linear function, a non-linear function, or a discrete function, as long as the weighting function keeps the measured CQI and the TCP/IP window size in positive correlation.

It is to be understood that, the CQI and the TCP/IP window size are merely illustrative embodiments, and other parameters associated with link quality and data transmission rates may be used instead, and the invention is not limited thereto. Likewise, the LTE protocol stack is merely an illustrative embodiment, and other wireless communications protocol may be used instead to replace the lower layers in the OSI model.

To clearly illustrate the advantages of the invention, the following description is given using the TCP/IP window size as an example of the data transmission parameter in step S430. As known in the art, the concept of a sliding window is used in TCP/IP for allowing multiple packets to be transmitted before a receiving device accepts acknowledgement packets. This kind of multi-transmission-multi-acknowledgement technology can increase network bandwidth utilization and the data transmission speed. Simply speaking, a receiving device may inform a transmitting device of the available buffer size for receiving packets using the TCP/IP window size. The transmitting device may decrease its data throughput when the TCP/IP window size drops, or increase its data throughput when the TCP/IP window size rises. Therefore, the invention may improve data throughput by dynamically adjusting the TCP/IP window size in the higher protocol layer, e.g., the network/transport layer, according to the link quality and number of transmission layers supported for spatial multiplexing obtained by the lower protocol layer, e.g., the physical layer.

Figure 5:
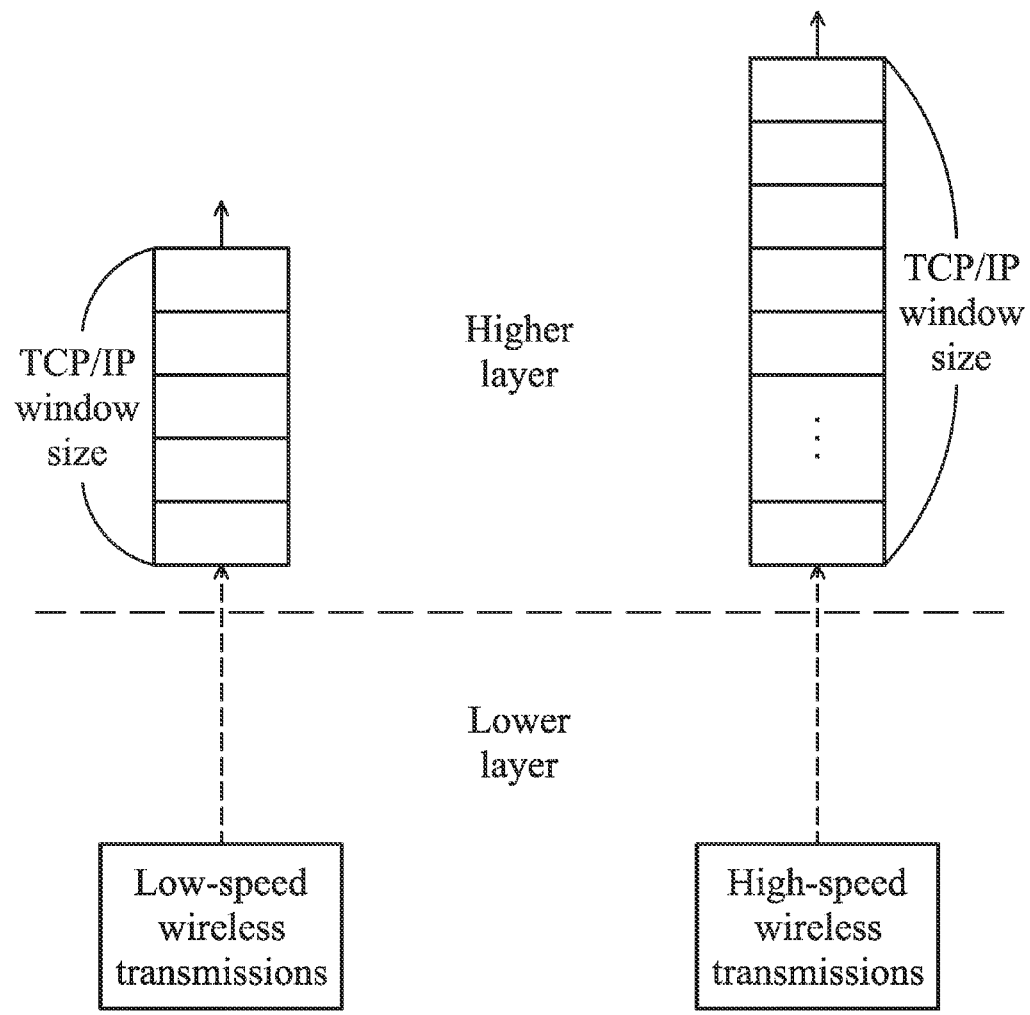
FIG. 5 is a schematic diagram illustrating the processing between the higher layer and the lower layer in a mobile communication device for downlink data transmission according to the invention.

FIG. 5 is a schematic diagram illustrating the processing between the higher layer and the lower layer in a mobile communication device for downlink data transmission according to the invention. As shown at the left side of FIG. 5, a scenario is depicted where a bad link quality, i.e., small CQI value, is measured and/or the number of transmission layers supported for spatial multiplexing is small, i.e., small RI value, in the lower layer, indicating that the lower layer can only provide low-speed wireless transmissions. Conventionally, the higher layer does not take the link quality and the number of transmission layers supported for spatial multiplexing obtained by the lower layer into account for determining the TCP/IP window size, and waste of power consumption and data stall may occur if the higher layer determines to use a large TCP/IP window size for high speed data transmission. Advantageously, for this scenario, the invention allows the higher layer to dynamically reduce the TCP/IP window size, so that power consumption may be saved and overall data throughput may be improved.

As shown at the right side of FIG. 5, another scenario is depicted where a good/fair link quality, i.e., large CQI value, is measured and/or the number of transmission layers supported for spatial multiplexing is large, i.e., large RI value, in the lower layer, indicating that the lower layer can provide high-speed wireless transmissions. Conventionally, the higher layer may determine to use a small TCP/IP window size for low speed data transmission while the lower layer may provide high-speed wireless transmissions. Advantageously, for this scenario, the invention allows the higher layer to dynamically increase the TCP/IP window size, so that overall data throughput may be improved.

Figure 6:
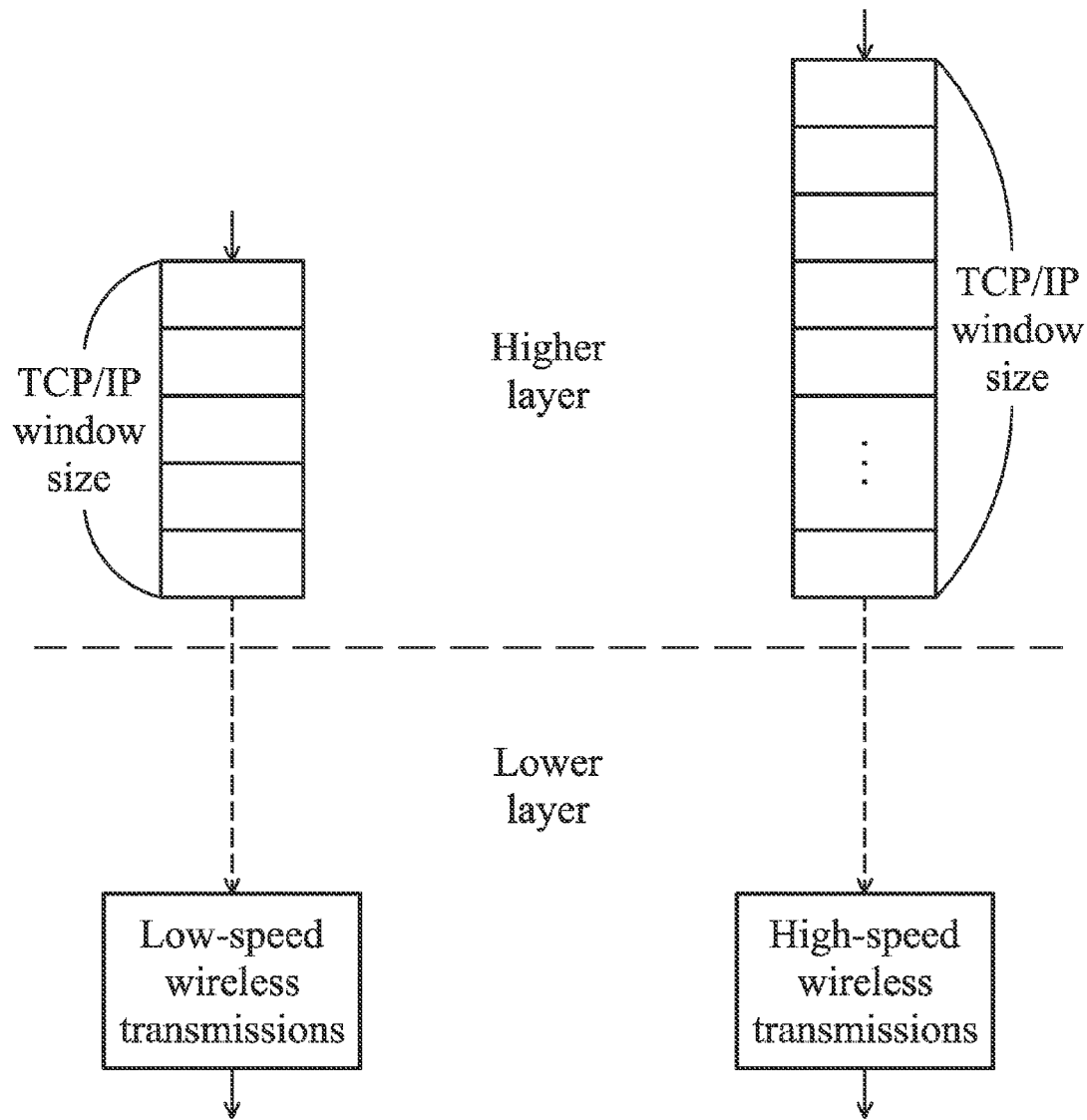
FIG. 6 is a schematic diagram illustrating the processing between the higher layer and the lower layer in a mobile communication device for uplink data transmission according to the invention.

Similarly, FIG. 6 is a schematic diagram illustrating the processing between the higher layer and the lower layer in a mobile communication device for uplink data transmission according to the invention. As shown at the left side of FIG. 6, a scenario is depicted where a bad link quality, i.e., small CQI value, is measured and/or the number of transmission layers supported for spatial multiplexing is small, i.e., small RI value, in the lower layer, and correspondingly, the higher layer dynamically reduces the TCP/IP window size. As shown at the right side of FIG. 6, another scenario is depicted where a good/fair link quality, i.e., large CQI value, is measured and/or the number of transmission layers supported for spatial multiplexing is large, i.e., large RI value, in the lower layer, indicating that the lower layer can provide high-speed wireless transmissions, and correspondingly, the higher layer dynamically increases the TCP/IP window size. Thus, the overall data throughput for downlink data transmission may be improved.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:
1. A mobile communication device, comprising:
a wireless module, performing wireless transceiving to and from a service network; and
a processor, measuring a Channel Quality Indicator (CQI) of a downward transmission link from the service network associated with a layer via the wireless module, determining a Rank Indicator (RI) used for Multiple-Input Multiple-Output (MIMO) associated with the Physical layer, and adjusting a Transmission Control Protocol (TCP) or Internet Protocol (IP) window size associated with a Transport layer or Network layer according to the CQI of the downward transmission link and the RI used for MIMO associated with the Physical layer, wherein the Transport layer or Network layer is hierarchically higher than the Physical layer in a multi-layer protocol stack, and wherein the adjusted TCP or IP window size equals to:

$$(MaxTCPWindowSize - MinTCPWindowSize) \times \frac{CQI\_Indexed\_TBS}{MAX\_CQI\_TBS} \div RI \times \text{Weight}$$

wherein the MaxTCPWindowSize represents a maximum TCP/IP window size, the MinTCPWindowSize represents a minimum TCP/IP window size, the CQI_Indexed_TBS represents a Transport Block Size (TBS) corresponding to the measured CQI, the MAX_CQI_TBS represents another TBS corresponding to a maximum CQI, and the Weight represents a constant or a weighting function of the measured CQI.

2. The mobile communication device of claim 1, wherein the TCP or IP window size is applied for downlink data transmission, or uplink data transmission, or both downlink and uplink data transmissions.

3. The mobile communication device of claim 1, wherein the wireless transceiving to and from the service network is performed using the Long Term Evolution (LTE) technology.

4. A data transmission method for a mobile communication device wirelessly connected to a service network according to a multi-layer protocol stack, comprising:

measuring a Channel Quality Indicator (CQI) of a downward transmission link from the service network associated with a Physical layer;

determining a Rank Indicator (RI) used for Multiple-Input Multiple-Output (MIMO) associated with the Physical layer; and adjusting a Transmission Control Protocol (TCP) or Internet Protocol (IP) window size associated with a Transport layer or Network layer according to the CQI of the downward transmission link and the RI used for MIMO associated with the Physical layer, wherein the Transport layer or Network layer is hierarchically higher than the Physical layer in the multi-layer protocol stack, and wherein the adjusted TCP or IP window size equals to:

$$(MaxTCPWindowSize - MinTCPWindowSize) \times \frac{CQI\_Indexed\_TBS}{MAX\_CQI\_TBS} \div RI \times \text{Weight}$$

wherein the MaxTCPWindowSize represents a maximum TCP/IP window size, the MinTCPWindowSize represents a minimum TCP/IP window size, the CQI_Indexed_TBS represents a Transport Block Size (TBS) corresponding to the measured CQI, the MAX_CQI_TBS represents another TBS corresponding to a maximum CQI, and the Weight represents a constant or a weighting function of the measured CQI.

5. The data transmission method of claim 4, wherein the TCP or IP window size is applied for downlink data transmission, or uplink data transmission, or both downlink and uplink data transmissions.

6. The data transmission method of claim 4, wherein communications between the mobile communication device and the service network are performed using the Long Term Evolution (LTE) technology.

* * * * *